(12) United States Patent
Wu (10) Patent No.: US 12,133,070 B2
(45) Date of Patent: Oct. 29, 2024

(54) OFF-LINE BATTERY SWAP METHOD, BATTERY CHARGING AND SWAP STATION, VEHICLE WITH BATTERY TO BE SWAPPED, AND READABLE STORAGE MEDIUM

(71) Applicant: NIO TECHNOLOGY (ANHUI) CO., LTD, Hefei (CN)

(72) Inventor: Yicheng Wu, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 372 days.

(21) Appl. No.: 17/578,658

(22) Filed: Jan. 19, 2022

(65) Prior Publication Data
US 2022/0227249 A1 Jul. 21, 2022

(30) Foreign Application Priority Data

Jan. 19, 2021 (CN) .......................... 202110070198.0

(51) Int. Cl.
*H04L 29/06* (2006.01)
*H04L 29/08* (2006.01)
(Continued)

(52) U.S. Cl.
CPC .............. *H04W 12/06* (2013.01); *B60L 53/66* (2019.02); *B60L 53/80* (2019.02); *H02J 7/00045* (2020.01); *H04L 67/10* (2013.01)

(58) Field of Classification Search
CPC .................................................. H04W 12/06
(Continued)

(56) References Cited

U.S. PATENT DOCUMENTS

| 8,515,865 B1 * | 8/2013 | Marathe | ................. B60L 53/60 705/40 |
| 2017/0225557 A1 * | 8/2017 | Newman | ................. B60L 53/65 |

(Continued)

FOREIGN PATENT DOCUMENTS

| EP | 2199143 A1 * | 6/2010 | ................ B60L 3/12 |
| TW | I751396 B  * | 1/2022 | |

(Continued)

*Primary Examiner* — Haresh N Patel
(74) *Attorney, Agent, or Firm* — Sheridan Ross P.C.

(57) ABSTRACT

The invention relates to the technical field of battery charging and swap, and in particular to an off-line battery swap method, a battery charging and swap station, a vehicle with a battery to be swapped, and a readable storage medium. The invention is intended to solve the problem that battery swap cannot be performed at a battery charging and swap station when a vehicle is not connected to a network or a cloud server has a fault. To this end, the off-line battery swap method of the invention includes: switching, by a battery charging and swap station, to a backup battery swap mode upon receiving a battery swap mode switching instruction; establishing, by a vehicle with a battery to be swapped, a communication connection with the battery charging and swap station by using backup connection information; authenticating, by the battery charging and swap station, the vehicle with a battery to be swapped; and performing, by the battery charging and swap station, battery swap for the vehicle with a battery to be swapped where the authentication is successful, the backup connection information being pre-stored in the vehicle with a battery to be swapped. According to the battery swap method of this application, a battery swap procedure can be completed in an off-line state, thereby effectively solving the problem that battery swap cannot be performed when a cloud server has a fault or a vehicle with a battery to be swapped is not connected to a network.

12 Claims, 4 Drawing Sheets

(51) Int. Cl.
  *H04W 12/06* (2021.01)
  *B60L 53/66* (2019.01)
  *B60L 53/80* (2019.01)
  *H02J 7/00* (2006.01)
  *H04L 67/10* (2022.01)
(58) Field of Classification Search
  USPC .......................................................... 726/5
  See application file for complete search history.

(56) References Cited

U.S. PATENT DOCUMENTS

| | | | | |
|---|---|---|---|---|
| 2020/0198494 | A1* | 6/2020 | Chen | B60L 58/12 |
| 2020/0272455 | A1* | 8/2020 | Mezaael | B60R 16/023 |
| 2021/0309121 | A1* | 10/2021 | Jain | B60L 53/305 |
| 2021/0399566 | A1* | 12/2021 | Visvesha | H04L 9/3265 |
| 2022/0393491 | A1* | 12/2022 | Zhang | H02J 7/0045 |

FOREIGN PATENT DOCUMENTS

| | | | | |
|---|---|---|---|---|
| VN | 10034533 B | * | 1/2023 | B60L 53/305 |
| WO | WO-2019007063 A1 | * | 1/2019 | H02J 7/00038 |

* cited by examiner

After a battery charging and swap station switches to a backup battery swap mode according to a received battery swap mode switching instruction, a vehicle with a battery to be swapped establishes a communication connection with the battery charging and swap station by using backup connection information, so that the battery charging and swap station authenticates the vehicle with a battery to be swapped, and where the authentication is successful, the battery charging and swap station performs battery swap for the vehicle with a battery to be swapped ⟵ S401

Fig. 5

OFF-LINE BATTERY SWAP METHOD, BATTERY CHARGING AND SWAP STATION, VEHICLE WITH BATTERY TO BE SWAPPED, AND READABLE STORAGE MEDIUM

CROSS-REFERENCE TO RELATED APPLICATION

This application claims the benefit of China Patent Application No. 202110070198.0 filed Jan. 19, 2021, the entire contents of which are incorporated herein by reference in its entirety.

TECHNICAL FIELD

The invention relates to the technical field of battery charging and swap, and in particular to an off-line battery swap method, a battery charging and swap station, a vehicle with a battery to be swapped, and a readable storage medium.

BACKGROUND ART

At present, solutions of electric energy replenishment for battery electric vehicles mainly include a charging solution and a battery swap solution. Compared with the charging solution, the battery swap solution has the advantage of high battery swap efficiency, which usually allows battery replacement to be finished in several minutes. Implementation of a normal battery swap process requires mutual cooperation of a vehicle, a cloud server, and a battery swap station, especially normal connection of the vehicle and the cloud server with a network.

However, in some particular scenarios, when the vehicle is not connected to a network or the cloud server has a fault, the vehicle cannot communicate with the cloud server normally. Consequently, battery swap cannot be performed normally.

Accordingly, there is a need in the art for a new technical solution to solve the above problems.

SUMMARY OF THE INVENTION

To solve at least one of the above problems in the prior art, that is, to solve the problem that battery swap cannot be performed at a battery charging and swap station when a vehicle is not connected to a network or a cloud server has a fault, the invention provides an off-line battery swap method. The off-line battery swap method includes: switching, by a battery charging and swap station, to a backup battery swap mode upon receiving a battery swap mode switching instruction; establishing, by a vehicle with a battery to be swapped, a communication connection with the battery charging and swap station by using backup connection information; authenticating, by the battery charging and swap station, the vehicle with a battery to be swapped; and performing, by the battery charging and swap station, battery swap for the vehicle with a battery to be swapped where the authentication is successful, the backup connection information being pre-stored in the vehicle with a battery to be swapped.

In the above preferred technical solution of the off-line battery swap method, the backup connection information includes at least one of backup account information, backup password information, and backup address information.

In the above preferred technical solution of the off-line battery swap method, the step of switching, by a battery charging and swap station, to a backup battery swap mode upon receiving a battery swap mode switching instruction further includes: separately switching, by the battery charging and swap station, account information, password information, and address information to the backup account information, the backup password information, and the backup address information upon receiving the battery swap mode switching instruction, the backup account information, the backup password information, and the backup address information being pre-stored at the battery charging and swap station.

In the above preferred technical solution of the off-line battery swap method, the battery swap mode switching instruction is an instruction sent by a cloud server or an instruction received by a human-machine interaction module.

In the above preferred technical solution of the off-line battery swap method, before the step of authenticating, by the battery charging and swap station, the vehicle with a battery to be swapped, the off-line battery swap method further includes: sending, by the vehicle with a battery to be swapped, backup authentication information to the battery charging and swap station; and the step of authenticating, by the battery charging and swap station, the vehicle with a battery to be swapped further includes: authenticating, by the battery charging and swap station and based on backup verification information, the vehicle with a battery to be swapped, the backup authentication information and the backup verification information being pre-stored in the vehicle with a battery to be swapped and at the battery charging and swap station, respectively.

In the above preferred technical solution of the off-line battery swap method, the backup connection information and/or the backup authentication information are/is delivered, in advance, by the cloud server to the vehicle with a battery to be swapped.

In the above preferred technical solution of the off-line battery swap method, the step of establishing, by a vehicle with a battery to be swapped, a communication connection with the battery charging and swap station by using backup connection information further includes: detecting, by the vehicle with a battery to be swapped, a wireless signal from the battery charging and swap station, and establishing the communication connection with the battery charging and swap station by using the backup account information and the backup password information.

This application further provides an off-line battery swap method. The off-line battery swap method includes: switching, by a battery charging and swap station, to a backup battery swap mode upon receiving a battery swap mode switching instruction; after a vehicle with a battery to be swapped establishes a communication connection with the battery charging and swap station by using backup connection information, authenticating, by the battery charging and swap station, the vehicle with a battery to be swapped; and performing, by the battery charging and swap station, battery swap for the vehicle with a battery to be swapped where the authentication is successful, the backup connection information being pre-stored in the vehicle with a battery to be swapped.

In the above preferred technical solution of the off-line battery swap method, the backup connection information includes at least one of backup account information, backup password information, and backup address information.

In the above preferred technical solution of the off-line battery swap method, the step of switching, by a battery charging and swap station, to a backup battery swap mode upon receiving a battery swap mode switching instruction further includes: separately switching, by the battery charging and swap station, account information, password information, and address information to the backup account information, the backup password information, and the backup address information upon receiving the battery swap mode switching instruction, the backup account information, the backup password information, and the backup address information being pre-stored at the battery charging and swap station.

In the above preferred technical solution of the off-line battery swap method, the battery swap mode switching instruction is an instruction sent by a cloud server or an instruction received by a human-machine interaction module.

In the above preferred technical solution of the off-line battery swap method, the step of authenticating, by the battery charging and swap station, the vehicle with a battery to be swapped further includes: receiving backup authentication information sent by the vehicle with a battery to be swapped; and authenticating, by the battery charging and swap station and based on backup verification information, the vehicle with a battery to be swapped, the backup authentication information and the backup verification information being pre-stored in the vehicle with a battery to be swapped and at the battery charging and swap station, respectively.

This application further provides a computer-readable storage medium storing a plurality of programs, where the programs are adapted to be loaded and executed by a processor to implement the off-line battery swap method according to any one of the above preferred technical solutions.

This application further provides a battery charging and swap station. The battery charging and swap station includes: a memory; a processor; and a computer program, where the computer program is stored in the memory, and is configured to be executed by the processor to implement the off-line battery swap method according to any one of the above preferred technical solutions.

This application further provides an off-line battery swap method. The off-line battery swap method includes: after a battery charging and swap station switches to a backup battery swap mode according to a received battery swap mode switching instruction, establishing, by a vehicle with a battery to be swapped, a communication connection with the battery charging and swap station by using backup connection information, so that the battery charging and swap station authenticates the vehicle with a battery to be swapped, and where the authentication is successful, performing, by the battery charging and swap station, battery swap for the vehicle with a battery to be swapped, the backup connection information being pre-stored in the vehicle with a battery to be swapped.

In the above preferred technical solution of the off-line battery swap method, the backup connection information includes at least one of backup account information, backup password information, and backup address information.

In the above preferred technical solution of the off-line battery swap method, after the step of establishing, by a vehicle with a battery to be swapped, a communication connection with the battery charging and swap station by using backup connection information, the off-line battery swap method further includes: sending, by the vehicle with a battery to be swapped, backup authentication information to the battery charging and swap station, so that the battery charging and swap station authenticates, based on backup verification information, the vehicle with a battery to be swapped, the backup authentication information and the backup verification information being pre-stored in the vehicle with a battery to be swapped and at the battery charging and swap station, respectively.

In the above preferred technical solution of the off-line battery swap method, the backup connection information and/or the backup authentication information are/is delivered, in advance, by the cloud server to the vehicle with a battery to be swapped.

In the above preferred technical solution of the off-line battery swap method, the step of establishing, by a vehicle with a battery to be swapped, a communication connection with the battery charging and swap station by using backup connection information further includes: detecting, by the vehicle with a battery to be swapped, a wireless signal from the battery charging and swap station, and establishing the communication connection with the battery charging and swap station by using the backup account information and the backup password information.

This application further provides a computer-readable storage medium storing a plurality of programs, where the programs are adapted to be loaded and executed by a processor to implement the off-line battery swap method according to any one of the above preferred technical solutions.

This application further provides a vehicle with a battery to be swapped. The vehicle with a battery to be swapped includes: a memory; a processor; and a computer program, where the computer program is stored in the memory, and is configured to be executed by the processor to implement the off-line battery swap method according to any one of the above preferred technical solutions.

It can be understood by those skilled in the art that in a preferred technical solution of the invention, an off-line battery swap method includes: switching, by a battery charging and swap station, to a backup battery swap mode upon receiving a battery swap mode switching instruction; establishing, by a vehicle with a battery to be swapped, a communication connection with the battery charging and swap station by using backup connection information; authenticating, by the battery charging and swap station, the vehicle with a battery to be swapped; and performing, by the battery charging and swap station, battery swap for the vehicle with a battery to be swapped where the authentication is successful, the backup connection information being pre-stored in the vehicle with a battery to be swapped.

According to the off-line battery swap method of this application, a backup battery swap mode of a battery charging and swap station is introduced, and only when the battery charging and swap station switches to the backup battery swap mode, a vehicle with a battery to be swapped can be connected to the battery charging and swap station by using backup connection information preset in the vehicle with a battery to be swapped, thereby implementing authentication. As such, the battery charging and swap station and the vehicle with a battery to be swapped can complete a battery swap procedure in an off-line state, to effectively solve the problem that battery swap cannot be performed when a cloud server has a fault or a vehicle with a battery to be swapped is not connected to a network. Moreover, although the vehicle with a battery to be swapped implements a communication connection with the battery charging and swap station in the backup battery swap mode by means of the backup connection information, this connection manner does not bring any substantial change to a battery swap process, and for the vehicle with a battery to be swapped, there is no difference between the battery swap process and a conventional battery swap process. Therefore, the battery swap method of this application can be implemented without any change to the vehicle with a battery to be swapped, reducing costs of development and upgrade of the vehicle with a battery to be swapped.

Further, before the battery charging and swap station authenticates the vehicle with a battery to be swapped, the vehicle with a battery to be swapped sends backup authentication information to the battery charging and swap station, so that the battery charging and swap station further authenticates, based on backup verification information, the vehicle with a battery to be swapped. In this way, the battery swap method of this application can further implement authentication where the vehicle is not connected to a network; moreover, the backup authentication information can be used only when the battery charging and swap station switches to the backup battery swap mode, which further improves the safety of a usual battery swap procedure.

Further, a cloud server or a human-machine interaction module is used to send a battery swap mode switching instruction, such that a process of switching to the backup battery swap mode is completely in charge of a battery charging and swap service side. When the backup battery swap mode is not switched to, the backup connection information stored in the vehicle with a battery to be swapped is unavailable. As such, the method in the present application ensures the safety of a usual battery swap procedure.

Further, the cloud server delivers, in advance, the backup connection information and/or the backup authentication information to the vehicle with a battery to be swapped, such that the vehicle with a battery to be swapped can store the backup connection information and/or the backup authentication information on the vehicle when connected to a network, thereby implementing off-line battery swap when the vehicle cannot be connected to a network or the cloud server has a fault.

BRIEF DESCRIPTION OF THE DRAWINGS

An off-line battery swap method, a battery charging and swap station, a vehicle with a battery to be swapped, and a readable storage medium of the invention are described below with reference to accompanying drawings and in conjunction with a battery electric vehicle. In the drawings.

LIST OF REFERENCE NUMERALS

1. Vehicle with battery to be swapped; 2. Cloud server; 3. Battery charging and swap station; and 4. Terminal

DETAILED DESCRIPTION OF EMBODIMENTS

Preferred embodiments of the invention are described below with reference to the accompanying drawings. It should be understood by those skilled in the art that these embodiments are only for explaining the technical principles of the invention and are not intended to limit the scope of protection of the invention. For example, although the embodiments are described in conjunction with a battery electric vehicle, it is not intended to limit the scope of protection of the invention. Without departing from the principles of the invention, those skilled in the art can apply the invention to other application scenarios. For example, the control method of this application may further be applied to other vehicles that require battery replacement.

In the description of the invention, a "module" and a "processor" may include hardware, software, or a combination thereof. A module may include a hardware circuit, various suitable sensors, a communication port, and a memory, or may include a software part, such as program code, or may be a combination of software and hardware. The processor may be a central processing unit, a microprocessor, a graphics processing unit, a digital signal processor, or any other suitable processor. The processor has a data and/or signal processing function. The processor may be implemented in software, hardware, or a combination thereof. A computer-readable storage medium includes any suitable medium that can store program code, such as a magnetic disk, a hard disk, an optical disc, a flash memory, a read-only memory, or a random access memory. The term "A and/or B" indicates all possible combinations of A and B, for example, only A, only B, or A and B. The term "at least one of A and B" has a meaning similar to "A and/or B" and may include only A, only B, or A and B. The terms "a/an" and "this" in the singular form may also include the plural form.

Figure 1:
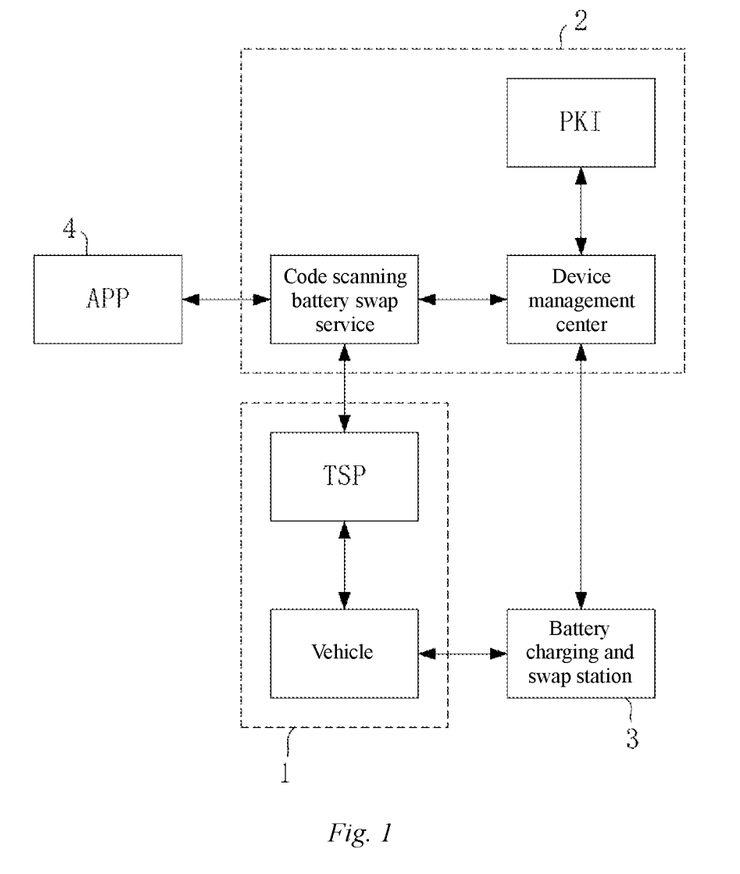
FIG. 1 is a system diagram of a battery swap process in the prior art.

First, referring to FIG. 1, a battery swap method in the prior art is described. FIG. 1 is a system diagram of a battery swap process in the prior art.

As shown in FIG. 1, the process of battery swap for a battery electric vehicle (hereinafter referred to as vehicle or vehicle with a battery to be swapped) in the prior art is generally as follows:

(1) A device management center module in a cloud server 2 creates one key pair in advance by using a public key infrastructure (PKI) module, for example, generates one public key and one private key by means of asymmetric key cryptography, where the private key is stored on the PKI module, and the public key is delivered to a battery charging and swap station 3 via the device management center module.

(2) A user requests battery swap by using an application installed on a terminal 4, for example, sends a battery swap request by using an application installed on a smartphone, a tablet computer, a notebook computer, or a head unit. Based on information of the vehicle 1 with a battery to be swapped that has sent the request and information of the battery charging and swap station 3 at which the vehicle 1 is currently located, a code scanning battery swap service module of the cloud server 2 obtains a Wi-Fi access point (AP), a Wi-Fi password, and authentication information of the battery charging and swap station 3, and requests the device management center module to sign the authentication information. The device management center module signs, upon receiving a signature request, these pieces of information by using the PKI module. The PKI module signs these pieces of information with the private key, and the device management center module then returns signed authentication information to a backstage of the code scanning battery swap service module.

(3) The backstage of the code scanning battery swap service module obtains the authentication information signed with the private key, and then delivers, via a telematics service provider (TSP) module, these pieces of information to a head unit of the vehicle 1 with a battery to be swapped. After successful delivery, a driver or a battery swap service staff operates on the head unit, and a battery swap service is enabled.

(4) After the battery swap service is enabled, the head unit may automatically search for the Wi-Fi AP of the battery charging and swap station 3, and is then connected to the battery charging and swap station by using the delivered Wi-Fi password. After successful connection, the head unit then sends the obtained authentication information to the battery charging and swap station 3 through Wi-Fi. The battery charging and swap station 3 verifies the authentication information by using the locally stored public key. After the verification is passed, the implementation of a battery swap procedure begins.

It can be learned from the background art and the above description that in a whole battery swap procedure, to ensure the safety of the battery swap process, the Wi-Fi AP, the Wi-Fi password, and the authentication information of the battery charging and swap station 3 need to be delivered from the cloud server 2 to the vehicle 1 with a battery to be swapped, so that the vehicle 1 with a battery to be swapped communicates with the battery charging and swap station 3 by using these pieces of information and thus implements authentication. However, in some possible application scenarios, it is inevitable that the cloud server 2 has a fault or the head unit is disconnected from a network. In this case, the vehicle 1 with a battery to be swapped cannot communicate with the cloud server 2 normally, and the Wi-Fi AP, the Wi-Fi password, and the authentication information of the battery charging and swap station 3 cannot be delivered, in time, to the vehicle 1 with a battery to be swapped, and consequently, battery swap cannot be performed.

However, it should be noted that, although the battery swap method in the prior art is described above, this does not mean that the control method of this application is only applicable to the prior art above. The battery swap method of this application is further applicable to any battery swap process that requires communication between a cloud server and a vehicle to deliver communication connection information and/or authentication information of a battery charging and swap station. In addition, although a description of performing battery swap for a vehicle with a battery to be swapped only at a battery charging and swap station is given in this embodiment, it can be understood by those skilled in the art that the above battery charging and swap station does not particularly mean an energy replenishment station with both a battery charging function and a battery swap function. Instead, any station with a battery swap function, as a battery charging and swap station, can apply the battery swap method of this application.

Embodiment 1

Figure 2:
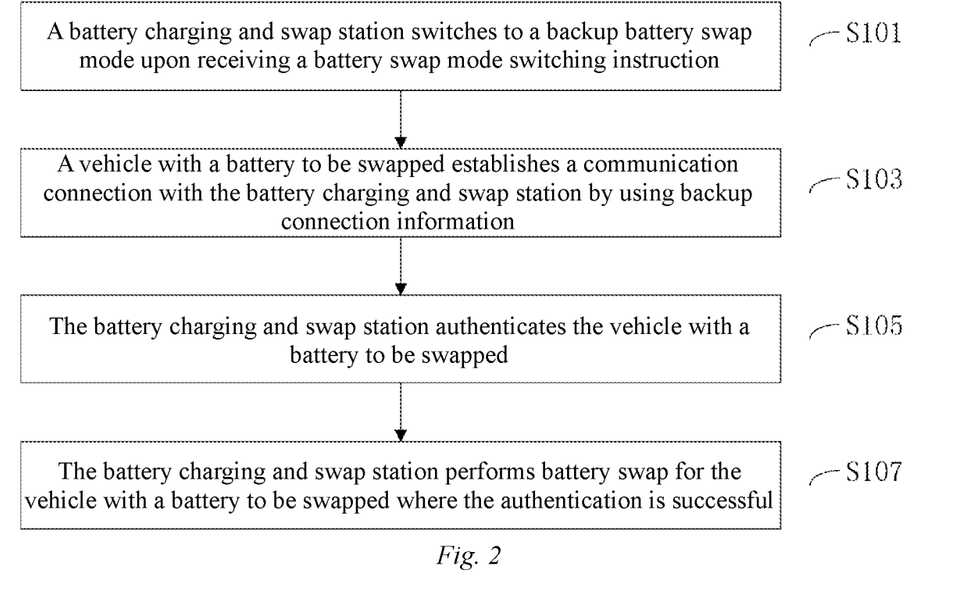
FIG. 2 is a main flowchart of an off-line battery swap method in a first embodiment of the invention.
Figure 3:
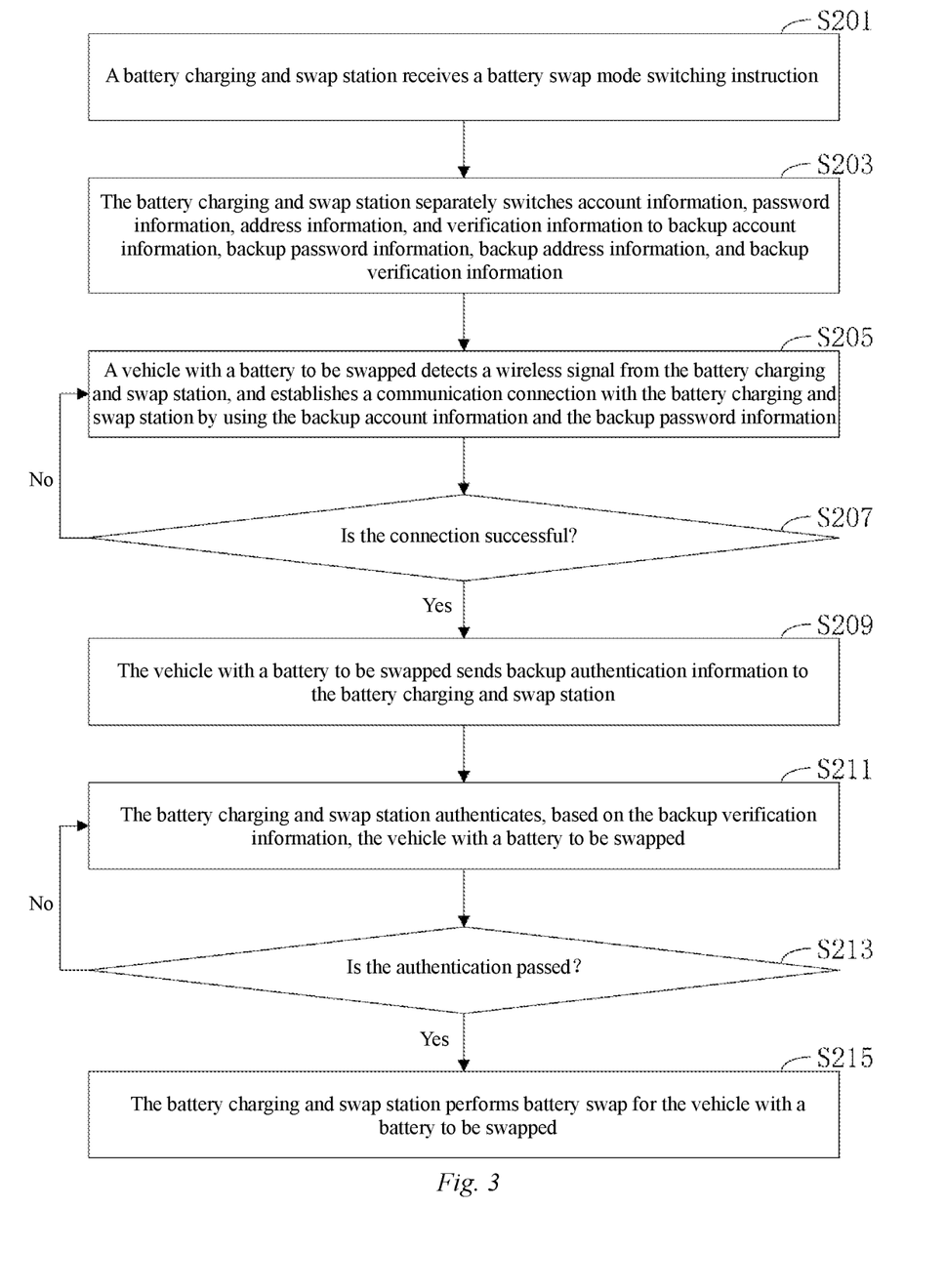
FIG. 3 is a flowchart of a preferred embodiment of an off-line battery swap method in a first embodiment of the invention.

Referring to FIG. 2 and FIG. 3 below, an off-line battery swap method according to a first embodiment of this application is described. FIG. 2 is a main flowchart of an off-line battery swap method in a first embodiment of the invention.

As shown in FIG. 2, to solve the problem that battery swap cannot be performed at a battery charging and swap station when a vehicle is not connected to a network or a cloud server has a fault, the off-line battery swap method of this application includes the steps as follows.

In S101, a battery charging and swap station switches to a backup battery swap mode upon receiving a battery swap mode switching instruction. For example, when a vehicle cannot be connected to a network, a staff sends the battery swap mode switching instruction by manually operating a human-machine interaction module (such as an HMI display screen, a tablet computer, or a mobile phone) at the battery charging and swap station, and the battery charging and swap station changes the current battery swap mode to the backup battery swap mode upon receiving the instruction. In this application, the backup battery swap mode refers to a battery swap manner in which a communication process, an authentication process, and a battery swap process between the vehicle with a battery to be swapped and the battery charging and swap station can also be normally implemented without the need of communication between the vehicle and the cloud server. In this backup battery swap mode, communication connection information and/or authentication information that are/is pre-stored in the vehicle with a battery to be swapped and at the battery charging and swap station and that are/is only used for the backup battery swap mode can be used to implement a communication connection between the vehicle with a battery to be swapped and the battery charging and swap station and authentication of the vehicle with a battery to be swapped, and normal battery swap is then implemented in an off-line state after the authentication is passed. On the contrary, when the backup battery swap mode is not switched to, even if communication connection information and/or authentication information for the backup battery swap mode are/is pre-stored in the vehicle with a battery to be swapped and at the battery charging and swap station, the communication connection between the vehicle with a battery to be swapped and the battery charging and swap station and authentication of the vehicle with a battery to be swapped cannot be implemented. Therefore, normal battery swap is hardly implemented without using the backup battery swap mode. The implementation in the mode is described specifically below.

Certainly, the battery swap mode switching instruction may be sent by the staff by manually operating the human-machine interaction module. In addition, the battery swap mode switching instruction may also be sent by the cloud server, provided that the cloud server is not faulty.

In S103, a vehicle with a battery to be swapped establishes a communication connection with the battery charging and swap station by using backup connection information. For example, the backup connection information may be the above Wi-Fi AP, Wi-Fi password, etc., and the information is pre-stored in the vehicle with a battery to be swapped. When the battery charging and swap station switches to the backup battery swap mode, the vehicle with a battery to be swapped detects a Wi-Fi signal near the battery charging and swap station, and matches the Wi-Fi signal with the Wi-Fi AP in the backup connection information. When the matching is successful, the vehicle with a battery to be swapped establishes the communication connection with the battery charging and swap station by inputting the Wi-Fi password in the backup connection information.

Certainly, it can be understood by those skilled in the art that in addition to using the Wi-Fi connection method, the vehicle with a battery to be swapped may further establish a communication connection with the battery charging and swap station by using other wireless communication methods, for example, Bluetooth, Zigbee, 4G/5G, etc.

In S105, the battery charging and swap station authenticates the vehicle with a battery to be swapped. For example, when the vehicle with a battery to be swapped and the battery charging and swap station respectively pre-stores backup authentication information and backup verification information, the vehicle with a battery to be swapped sends the backup authentication information (for example, authentication information signed with a private key in advance) stored in the vehicle itself to the battery charging and swap station, and the battery charging and swap station receives the backup authentication information, and authenticates, based on the backup authentication information and the backup verification information (a backup public key) stored at the battery charging and swap station itself, the vehicle with a battery to be swapped. For another example, when the battery charging and swap station and the vehicle with a battery to be swapped do not respectively store particular backup verification information and backup authentication information, the authentication may also be implemented based on a specific algorithm By way of example, the battery charging and swap station sends an authentication code to the vehicle with a battery to be swapped. The vehicle with a battery to be swapped calculates an answer-back code based on the authentication code according to a predetermined algorithm, and returns the answer-back code to the battery charging and swap station. The battery charging and swap station verifies whether the answer-back code is correct, and if the answer-back code is correct, the authentication is passed.

Certainly, the above two authentication methods are merely for describing the principles of this application, and are not intended to limit the scope of protection of this application. Those skilled in the art may adjust the above authentication methods, as long as the adjusted method can implement authentication of the vehicle with a battery to be swapped. For example, the battery charging and swap station may also send the verification information to the vehicle with a battery to be swapped, and the vehicle with a battery to be swapped performs authentication, etc.

In S107, the battery charging and swap station performs battery swap for the vehicle with a battery to be swapped where the authentication is successful. For example, where the authentication is successful, the vehicle with a battery to be swapped stops at a position for battery swap in the battery charging and swap station, so that a battery swap robot at the battery charging and swap station implements battery replacement for the vehicle with a battery to be swapped.

It can be learned from the above description that, a backup battery swap mode of a battery charging and swap station is introduced, and only when the battery charging and swap station switches to the backup battery swap mode, a vehicle with a battery to be swapped can be connected to the battery charging and swap station by using backup connection information preset in the vehicle with a battery to be swapped, thereby implementing authentication. As such, the battery charging and swap station and the vehicle with a battery to be swapped can complete a battery swap procedure in an off-line state, to effectively solve the problem that battery swap cannot be performed when a cloud server has a fault or a vehicle with a battery to be swapped is not connected to a network. Moreover, although the vehicle with a battery to be swapped implements a communication connection with the battery charging and swap station in the backup battery swap mode by means of the backup connection information, this connection manner does not bring any substantial change to a battery swap process, and for the vehicle with a battery to be swapped, there is no difference between the battery swap process and a conventional battery swap process. Therefore, the battery swap method of this application can be implemented without any change to the vehicle with a battery to be swapped, reducing costs of development and upgrade of the vehicle with a battery to be swapped.

A preferred battery swap process of this embodiment is described below in conjunction with FIG. 3. FIG. 3 is a flowchart of a preferred embodiment of the off-line battery swap method in the first embodiment of the invention.

As shown in FIG. 3, in the preferred embodiment, the off-line battery swap method includes the steps as follows.

In S201, a battery charging and swap station receives a battery swap mode switching instruction. For example, when at least one of a cloud server and a vehicle with a battery to be swapped has a fault, a staff at the battery swap station sends the battery swap mode instruction by using a human-machine interaction module, and the battery charging and swap station receives the battery swap mode switching instruction.

In S203, the battery charging and swap station separately switches account information, password information, address information, and verification information to backup account information, backup password information, backup address information, and backup verification information. The backup account information, the backup password information, and the backup address information, which are used as backup connection information, are pre-stored at the battery charging and swap station together with the backup verification information (a backup public key). The pre-storage may involve delivering the information by the cloud server when the communication between the cloud server and the battery charging and swap station is good, or manually entering the information into a system of the battery charging and swap station by a staff, or storing the information in the system when the battery charging and swap station is built. Furthermore, when the backup connection information and/or the backup verification information are/is updated, the updated information may be delivered by a cloud or entered by a staff. In addition, to ensure that all different battery charging and swap stations can enable an off-line battery swap mode, in this application, backup account information, backup password information, backup address information, and backup verification information used by all the battery charging and swap stations when entering the backup battery swap mode can be kept consistent.

By way of example, when the battery charging and swap station receives the battery swap mode switching instruction, in response to the instruction, the battery charging and swap station invokes a backup Wi-Fi AP, a backup Wi-Fi password, and a backup address ID and a backup public key of the battery charging and swap station, which are stored in the system of the battery charging and swap station, to replace a usual Wi-Fi AP and a usual Wi-Fi password used in a usual battery swap mode, and a usual address ID and a usual public key of the battery charging and swap station.

In S205, the vehicle with a battery to be swapped detects a wireless signal from the battery charging and swap station, and establishes a communication connection with the battery charging and swap station by using the backup account information and the backup password information. The backup account information, the backup password information, and the backup address information, which are used as backup connection information, are pre-stored in the vehicle with a battery to be swapped together with backup authentication information (authentication information signed with a private key in advance). The pre-storage may occur when a vehicle is delivered to a user, or when another vehicle can communicate with a cloud server through a network connection. Moreover, with one successful delivery, the above information is stored permanently in a head unit. In addition, when the backup connection information and/or the backup authentication information are/is updated, the updated information may be delivered by a cloud, to ensure that the latest backup connection information and backup authentication information are always stored in the vehicle.

By way of example, after the battery charging and swap station switches to the backup battery swap mode, a service staff or a vehicle owner requests battery swap by using a head unit, and the vehicle with a battery to be swapped detects a Wi-Fi signal near the battery charging and swap station, and matches the Wi-Fi signal with the backup Wi-Fi AP in the backup connection information. When the matching is successful, the vehicle with a battery to be swapped establishes the communication connection with the battery charging and swap station by inputting the backup Wi-Fi password in the backup connection information.

In S207, it is determined whether the communication connection is successful. When the connection is successful, step S209 is performed; or when the connection is not successful, the process returns to step S205 to repeat the step. In this step, when the communication connection is successful, it is indicated that the battery swap step can be continued; or, when the communication connection is not successful, battery swap cannot be continued.

In S209, the vehicle with a battery to be swapped sends backup authentication information to the battery charging and swap station. For example, when the communication connection between the vehicle with a battery to be swapped and the battery charging and swap station is successful, the vehicle with a battery to be swapped sends the backup authentication information (authentication information signed with a private key in advance) to the battery charging and swap station through Wi-Fi, so that the battery charging and swap station authenticates, based on the backup authentication information, the vehicle with a battery to be swapped.

In S211, the battery charging and swap station authenticates, based on the backup verification information, the vehicle with a battery to be swapped. For example, after receiving the backup authentication information, the battery charging and swap station verifies, by using the locally stored backup verification information (a backup public key), the backup authentication information sent by the vehicle.

In S213, it is determined whether the authentication is passed. When the authentication is passed, step S215 is performed; or when the authentication is not passed, the process returns to step S211 to repeat the step. In this step, when the authentication is passed, it is indicated that the battery swap step can be continued; or, when the authentication is not passed, battery swap cannot be continued.

In S215, the battery charging and swap station performs battery replacement for the vehicle with a battery to be swapped. For example, where the authentication is successful, the vehicle with a battery to be swapped stops at a position for battery swap in the battery charging and swap station, so that a battery swap robot at the battery charging and swap station implements battery replacement for the vehicle with a battery to be swapped.

The advantages of the above preferred technical solution are as follows.

A cloud server or a human-machine interaction module is used to send a battery swap mode switching instruction, such that a process of switching to the backup battery swap mode is completely in charge of a battery charging and swap service side. When the battery charging and swap station does not switch to the backup battery swap mode, the backup connection information and the backup authentication information stored in the vehicle with a battery to be swapped are unavailable, As such, the safety of a usual battery swap procedure is ensured.

Both the backup connection information and backup authentication information are stored, and when there is an update, the above information can be updated, such that the safety of a process of establishing a communication connection between the vehicle with a battery to be swapped and the battery charging and swap station and the safety of an authentication process can both be ensured. In addition, the backup account information, backup password information, backup address information, and backup verification information used by all battery charging and swap stations when entering the backup battery swap mode are kept consistent in such a setting manner that all the different battery charging and swap stations can enable the same off-line battery swap mode, thereby making development of a battery charging and swap station less difficult.

The backup address information is added to the backup connection information, such that backup connection information and backup authentication information stored at a vehicle side can be specially labeled, preventing the vehicle side from deleting the backup connection information and the backup authentication information, and also allowing the vehicle side to know that the current battery charging and swap station is in the backup battery swap mode.

Before the battery charging and swap station authenticates the vehicle with a battery to be swapped, the vehicle with a battery to be swapped sends backup authentication information to the battery charging and swap station, so that the battery charging and swap station authenticates, based on backup verification information, the vehicle with a battery to be swapped. In this way, the battery swap method of this application can further implement authentication where the vehicle is not connected to a network; moreover, the backup authentication information can be used only when the battery charging and swap station switches to the backup battery swap mode, which further improves the safety of a usual battery swap procedure.

The cloud server delivers, in advance, the backup connection information and the backup authentication information to the vehicle with a battery to be swapped, such that the vehicle with a battery to be swapped can store the backup connection information and the backup authentication information on the vehicle when connected to a network, thereby implementing off-line battery swap when the vehicle cannot be connected to a network or the cloud server has a fault.

It should be noted that the above preferred embodiment is merely used to illustrate the principles of the invention, and is not intended to limit the scope of protection of the invention. Those skilled in the art can adjust the above arrangements without deviating from the principles of the invention, so that the invention can be applied to more specific application scenarios.

For example, in an alternative embodiment, the backup connection information and the backup authentication information may be partially stored in the vehicle or at the battery charging and swap station, provided that the backup connection information at least includes one of the backup account information, the backup password information, and the backup address information.

Embodiment 2

Figure 4:
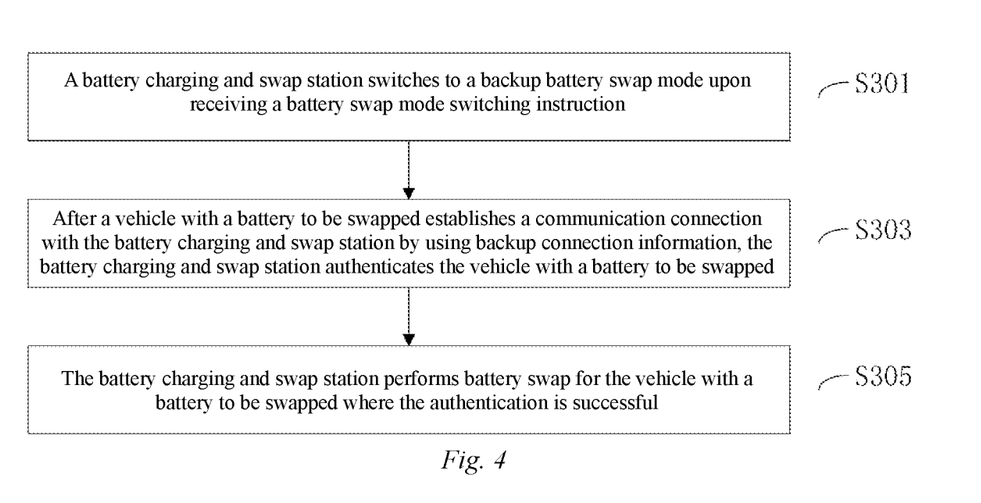
FIG. 4 is a flowchart of an off-line battery swap method in a second embodiment of the invention.

Referring to FIG. 4 below, an off-line battery swap method according to a second embodiment of this application is briefly described. FIG. 4 is a flowchart of an off-line battery swap method in a second embodiment of the invention.

As shown in FIG. 4, the off-line battery swap method in this embodiment includes the steps as follows.

In S301, a battery charging and swap station switches to a backup battery swap mode upon receiving a battery swap mode switching instruction. For example, when a vehicle cannot be connected to a network, the battery swap mode switching instruction is sent by a staff by manually operating a human-machine interaction module in the battery charging and swap station, or the battery swap mode switching instruction is sent by a cloud server when the cloud server is not faulty. Upon receiving the instruction, the battery charging and swap station changes the current battery swap mode to the backup battery swap mode.

In S303, after a vehicle with a battery to be swapped establishes a communication connection with the battery charging and swap station by using backup connection information, the battery charging and swap station authenticates the vehicle with a battery to be swapped. The backup connection information includes backup account information, backup password information, and backup address information, such as a backup address ID of the battery charging and swap station, a backup Wi-Fi AP, and a backup Wi-Fi password, which are pre-stored in the vehicle with a battery to be swapped. The pre-storage may occur when a vehicle is delivered to a user, or when another vehicle can communicate with a cloud server through a network connection. Moreover, with one successful delivery, the above information is stored permanently in a head unit. In addition, when the backup connection information is updated, the updated information may be delivered by a cloud, to ensure that the latest backup connection information is always stored in the vehicle.

By way of example, after the battery charging and swap station switches to the backup battery swap mode, the vehicle with a battery to be swapped detects a Wi-Fi signal near the battery charging and swap station, and matches the Wi-Fi signal with the backup Wi-Fi AP in the backup connection information. When the matching is successful, the vehicle with a battery to be swapped establishes the communication connection with the battery charging and swap station by inputting the backup Wi-Fi password in the backup connection information. After the communication connection is successful, the vehicle with a battery to be swapped sends the backup authentication information (authentication information signed with a private key in advance) to the battery charging and swap station, and the battery charging and swap station receives the backup authentication information, and authenticates, based on the backup authentication information and the backup verification information (a backup public key) stored at the battery charging and swap station itself, the vehicle with a battery to be swapped.

In S305, the battery charging and swap station performs battery swap for the vehicle with a battery to be swapped where the authentication is successful. For example, where the authentication is successful, the vehicle with a battery to be swapped stops at a position for battery swap in the battery charging and swap station, so that a battery swap robot at the battery charging and swap station implements battery replacement for the vehicle with a battery to be swapped.

In the above embodiment, the step in which a battery charging and swap station switches to a backup battery swap mode upon receiving a battery swap mode switching instruction further includes:

upon receiving the battery swap mode switching instruction, the battery charging and swap station separately switches account information, password information, address information, and verification information to backup account information, backup password information, backup address information, and backup verification information. The backup account information, the backup password information, and the backup address information, which are used as backup connection information, are pre-stored at the battery charging and swap station together with the backup verification information (a backup public key). The pre-storage may involve delivering the information by the cloud server when the communication between the cloud server and the battery charging and swap station is good, or manually entering the information into a system of the battery charging and swap station by a staff, or storing the information in the system when the battery charging and swap station is built. Furthermore, when the backup connection information and/or the backup verification information are/is updated, the updated information may be delivered by a cloud or entered by a staff. In addition, to ensure that all different battery charging and swap stations can enable an off-line battery swap mode, in this application, backup account information, backup password information, backup address information, and backup verification information used by all the battery charging and swap stations when entering the backup battery swap mode can be kept consistent.

By way of example, when the battery charging and swap station receives the battery swap mode switching instruction, in response to the instruction, the battery charging and swap station invokes a backup Wi-Fi AP, a backup Wi-Fi password, and a backup address ID and a backup public key of the battery charging and swap station, which are stored in the system of the battery charging and swap station, to replace a usual Wi-Fi AP and a usual Wi-Fi password used in a usual battery swap mode, and a usual address ID and a usual public key of the battery charging and swap station.

In the above embodiment, the step in which the battery charging and swap station authenticates the vehicle with a battery to be swapped further includes: receiving backup authentication information sent by the vehicle with a battery to be swapped. The backup authentication information (authentication information signed with a private key in advance) is pre-stored in the vehicle with a battery to be swapped. The pre-storage may occur when a vehicle is delivered to a user, or when another vehicle can communicate with a cloud server through a network connection. Moreover, with one successful delivery, the above information is stored permanently in a head unit. In addition, when the backup authentication information is updated, the updated information may be delivered by a cloud, to ensure that the latest backup authentication information is always stored in the vehicle.

The battery charging and swap station authenticates, based on the backup verification information, the vehicle with a battery to be swapped. The backup verification information (a backup public key) is pre-stored at the battery charging and swap station. The pre-storage may involve delivering the information by the cloud server when the communication between the cloud server and the battery charging and swap station is good, or manually entering the information into a system of the battery charging and swap station by a staff, or storing the information in the system when the battery charging and swap station is built. Furthermore, when the above backup verification information is updated, the updated information may be delivered by a cloud or entered by a staff.

By way of example, when the communication connection between the vehicle with a battery to be swapped and the battery charging and swap station is successful, the vehicle with a battery to be swapped sends the backup authentication information (authentication information signed with a private key in advance) to the battery charging and swap station through Wi-Fi. After receiving the backup authentication information, the battery charging and swap station verifies, by using the locally stored backup verification information (a backup public key), the backup authentication information sent by the vehicle.

Based on the embodiments of the above off-line battery swap method, this application further provides a computer-readable storage medium. In an embodiment of the invention, the computer-readable storage medium may be configured to store a program that executes the off-line battery swap method in the above method embodiment, and the program may be loaded and run by a processor to implement the above off-line battery swap method. For ease of description, only parts related to the embodiment of the invention are shown. For specific technical details that are not disclosed, refer to the method part of the embodiments of the invention. The computer-readable storage medium may be a computer-readable storage medium device formed by various electronic devices. Optionally, the storage in the embodiments of the invention is a non-transitory computer-readable storage medium.

Further, based on the embodiments of the above off-line battery swap method, the invention further provides a battery charging and swap station. In an embodiment of this application, the battery charging and swap station includes a memory, a processor, and a computer program stored in the memory. The memory is configured to store a program that executes the off-line battery swap method in the above method embodiment. The processor may be configured to execute the program in the memory, and the program includes, but is not limited to, the program that executes the off-line battery swap method in the above method embodiment. For ease of description, only parts related to the embodiment of the invention are shown. For specific technical details that are not disclosed, refer to the method part of the embodiments of the invention.

Embodiment 3

Figure 5:
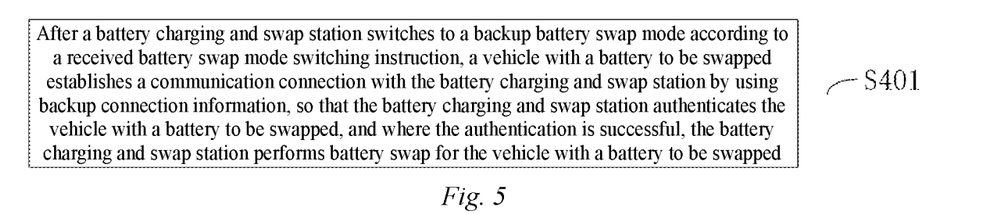
FIG. 5 is a flowchart of an off-line battery swap method in a third embodiment of the invention.

Referring to FIG. 5 below, an off-line battery swap method according to a third embodiment of this application is briefly described. FIG. 5 is a flowchart of the off-line battery swap method in the third embodiment of the invention.

As shown in FIG. 5, the off-line battery swap method in this embodiment includes the steps as follows.

In S401, after a battery charging and swap station switches to a backup battery swap mode according to a received battery swap mode switching instruction, a vehicle with a battery to be swapped establishes a communication connection with the battery charging and swap station by using backup connection information, so that the battery charging and swap station authenticates the vehicle with a battery to be swapped, and where the authentication is successful, the battery charging and swap station performs battery swap for the vehicle with a battery to be swapped. The backup account information, the backup password information, and the backup address information, which are used as backup connection information, are pre-stored in the vehicle with a battery to be swapped. The pre-storage may occur when a vehicle is delivered to a user, or when another vehicle can communicate with a cloud server through a network connection. Moreover, with one successful delivery, the above information is stored permanently in a head unit. In addition, when the backup connection information is updated, the updated information may be delivered by a cloud, to ensure that the latest backup connection information is always stored in the vehicle.

For example, when a vehicle cannot be connected to a network, the battery swap mode switching instruction is sent by a staff by manually operating a human-machine interaction module in the battery charging and swap station, or the battery swap mode switching instruction is sent by a cloud server when the cloud server is not faulty. Upon receiving the instruction, the battery charging and swap station changes the current battery swap mode to the backup battery swap mode. After the battery charging and swap station switches to the backup battery swap mode, the vehicle with a battery to be swapped detects a Wi-Fi signal near the battery charging and swap station, and matches the Wi-Fi signal with the backup Wi-Fi AP in the backup connection information. When the matching is successful, the vehicle with a battery to be swapped establishes the communication connection with the battery charging and swap station by inputting the backup Wi-Fi password in the backup connection information. After the communication connection, the vehicle with a battery to be swapped sends the backup authentication information (for example, authentication information signed with a private key in advance) to the battery charging and swap station, and the battery charging and swap station receives the backup authentication information, and authenticates, based on the backup authentication information and the backup verification information (a backup public key) stored at the battery charging and swap station itself, the vehicle with a battery to be swapped. Further, where the authentication is passed, the battery charging and swap station replaces a traction battery for the vehicle with a battery to be swapped.

In the above embodiment, after the step in which a vehicle with a battery to be swapped establishes a communication connection with the battery charging and swap station by using backup connection information, the off-line battery swap method further includes: sending, by the vehicle with a battery to be swapped, backup authentication information to the battery charging and swap station, so that the battery charging and swap station authenticates, based on backup verification information, the vehicle with a battery to be swapped. The backup verification information and the backup authentication information are respectively pre-stored at the battery charging and swap station and in the vehicle with a battery to be swapped. The pre-storage of the backup verification information (a backup public key) of the battery charging and swap station may involve delivering the information by the cloud server when the communication between the cloud server and the battery charging and swap station is good, or manually entering the information into a system of the battery charging and swap station by a staff, or storing the information in the system when the battery charging and swap station is built. Furthermore, when the backup verification information is updated, the updated information may be delivered by a cloud or entered by a staff. The backup authentication information (authentication information signed with a private key in advance) of the vehicle with a battery to be swapped is pre-stored in the vehicle with a battery to be swapped. The storage may occur when a vehicle is delivered to a user, or when another vehicle can communicate with a cloud server through a network connection. Moreover, with one successful delivery, the above information is stored permanently in a head unit. In addition, when the backup authentication information is updated, the updated information may be delivered by a cloud, to ensure that the latest backup authentication information is always stored in the vehicle.

For example, when the communication connection between the vehicle with a battery to be swapped and the battery charging and swap station is successful, the vehicle with a battery to be swapped sends the backup authentication information to the battery charging and swap station through Wi-Fi, so that the battery charging and swap station verifies, by using the locally stored backup verification information, the backup authentication information sent by the vehicle.

In the above embodiment, the step in which a vehicle with a battery to be swapped establishes a communication connection with the battery charging and swap station by using backup connection information further includes: detecting, by the vehicle with a battery to be swapped, a wireless signal from the battery charging and swap station, and establishing the communication connection with the battery charging and swap station by using the backup account information and the backup password information.

By way of example, after the battery charging and swap station switches to the backup battery swap mode, a service staff or a vehicle owner requests battery swap by using a head unit, and the vehicle with a battery to be swapped detects a Wi-Fi signal near the battery charging and swap station, and matches the Wi-Fi signal with the backup Wi-Fi AP in the backup connection information. When the matching is successful, the vehicle with a battery to be swapped establishes the communication connection with the battery charging and swap station by inputting the backup Wi-Fi password in the backup connection information.

Based on the embodiments of the above off-line battery swap method, this application further provides a computer-readable storage medium. In an embodiment of the invention, the computer-readable storage medium may be configured to store a program that executes the off-line battery swap method in the above method embodiment, and the program may be loaded and run by a processor to implement the above off-line battery swap method. For ease of description, only parts related to the embodiment of the invention are shown. For specific technical details that are not disclosed, refer to the method part of the embodiments of the invention. The computer-readable storage medium may be a computer-readable storage medium device formed by various electronic devices. Optionally, the storage in the embodiments of the invention is a non-transitory computer-readable storage medium.

Further, based on the embodiments of the above off-line battery swap method, the invention further provides a vehicle with a battery to be swapped. In an embodiment of this application, the vehicle with a battery to be swapped includes a memory, a processor, and a computer program stored in the memory. The memory is configured to store a program that executes the off-line battery swap method in the above method embodiment. The processor may be configured to execute the program in the memory, and the program includes, but is not limited to, the program that executes the off-line battery swap method in the above method embodiment. For ease of description, only parts related to the embodiment of the invention are shown. For specific technical details that are not disclosed, refer to the method part of the embodiments of the invention.

It should be noted that although the detailed steps of the method of the invention are described in detail above, those skilled in the art can combine, split, and change the order of the above steps without departing from the basic principles of the invention. The technical solution modified in such a way does not change the basic idea of the invention, and therefore also falls within the scope of protection of the invention.

Those skilled in the art should also be able to realize that the method steps of the examples described in conjunction with the embodiments disclosed herein can be implemented in electronic hardware, computer software or a combination of both. To clearly illustrate the interchangeability of electronic hardware and software, the compositions and steps of the examples have been generally described in terms of functionality in the above description. Whether these functions are performed in electronic hardware or software depends on the specific application and design constraints of the technical solution. Those skilled in the art can implement the described functions by using different methods for each particular application, but such implementation should not be considered as going beyond the scope of the invention.

Heretofore, the technical solutions of the invention have been described in conjunction with the preferred embodiments shown in the drawings. However, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions fall within the scope of protection of the invention.

What is claimed is:

1. An off-line battery swap method, comprising:
switching, by a battery charging and swap station, to a backup battery swap mode upon receiving a battery swap mode switching instruction;
establishing, by a vehicle with a battery to be swapped, a communication connection with the battery charging and swap station by using backup connection information;
authenticating, by the battery charging and swap station, the vehicle with the battery to be swapped; and
performing, by the battery charging and swap station, battery swap for the vehicle with the battery to be swapped where the authentication is successful,
wherein the backup connection information is pre-stored in the vehicle,
wherein before the step of authenticating, by the battery charging and swap station, the vehicle with the battery to be swapped, the off-line battery swap method further comprises:
sending, by the vehicle with the battery to be swapped, backup authentication information to the battery charging and swap station, wherein the backup authentication information is authentication information signed with a private key in advance and pre-stored in the vehicle, and wherein the step of authenticating, by the battery charging and swap station, the vehicle with the battery to be swapped further comprises:
authenticating, by the battery charging and swap station and based on backup verification information, the vehicle with the battery to be swapped, wherein the backup verification information is a backup public key matched to the private key and pre-stored at the battery charging and swap station.

2. The off-line battery swap method according to claim 1, wherein the backup connection information comprises at least one of backup account information, backup password information, and backup address information.

3. The off-line battery swap method according to claim 2, wherein the step of switching, by the battery charging and swap station, to the backup battery swap mode upon receiving the battery swap mode switching instruction further comprises:
switching, by the battery charging and swap station, account information to the backup account information, password information to the backup password information, and address information to the backup address information, upon receiving the battery swap mode switching instruction,
wherein the backup account information, the backup password information, and the backup address information are pre-stored at the battery charging and swap station.

4. The off-line battery swap method according to claim 2, wherein the step of establishing, by the vehicle with the battery to be swapped, the communication connection with the battery charging and swap station by using the backup connection information further comprises:
detecting, by the vehicle with the battery to be swapped, a wireless signal from the battery charging and swap station, and establishing the communication connection with the battery charging and swap station by using the backup account information and the backup password information.

5. The off-line battery swap method according to claim 1, wherein the battery swap mode switching instruction is an instruction sent by a cloud server or an instruction received by a human-machine interaction module.

6. The off-line battery swap method according to claim 1, wherein the backup connection information and/or the backup authentication information are/is delivered, in advance, by a cloud server to the vehicle.

7. An off-line battery swap method, comprising:
switching, by a battery charging and swap station, to a backup battery swap mode upon receiving a battery swap mode switching instruction;
after a vehicle with a battery to be swapped establishes a communication connection with the battery charging and swap station by using backup connection information, authenticating, by the battery charging and swap station, the vehicle with the battery to be swapped; and
performing, by the battery charging and swap station, battery swap for the vehicle with the battery to be swapped where the authentication is successful,
wherein the backup connection information is pre-stored in the vehicle,
wherein the step of authenticating, by the battery charging and swap station, the vehicle with the battery to be swapped further comprises:
receiving backup authentication information sent by the vehicle with the battery to be swapped, wherein the backup authentication information is authentication information signed with a private key in advance and pre-stored in the vehicle; and
authenticating, by the battery charging and swap station and based on backup verification information, the vehicle with the battery to be swapped, wherein the backup verification information is a backup public key matched to the private key and pre-stored at the battery charging and swap station.

8. The off-line battery swap method according to claim 7, wherein the backup connection information comprises at least one of backup account information, backup password information, and backup address information.

9. The off-line battery swap method according to claim 8, wherein the step of switching, by the battery charging and swap station, to the backup battery swap mode upon receiving the battery swap mode switching instruction further comprises:
switching, by the battery charging and swap station, account information to the backup account information, password information to the backup password information, and address information to the backup address information, upon receiving the battery swap mode switching instruction,
wherein the backup account information, the backup password information, and the backup address information are pre-stored at the battery charging and swap station.

10. The off-line battery swap method according to claim 7, wherein the battery swap mode switching instruction is an instruction sent by a cloud server or an instruction received by a human-machine interaction module.

11. An off-line battery swap method, comprising:
after a battery charging and swap station switches to a backup battery swap mode according to a received battery swap mode switching instruction, establishing, by a vehicle with a battery to be swapped, a communication connection with the battery charging and swap station by using backup connection information, so that the battery charging and swap station authenticates the vehicle with the battery to be swapped, and where the authentication is successful, performing, by the battery charging and swap station, battery swap for the vehicle with the battery to be swapped,
wherein the backup connection information is pre-stored in the vehicle;
wherein after the step of establishing, by the vehicle with the battery to be swapped, the communication connection with the battery charging and swap station by using the backup connection information, the off-line battery swap method further comprises:
sending, by the vehicle with the battery to be swapped, backup authentication information to the battery charging and swap station, wherein the backup authentication information is authentication information signed with a private key in advance and pre-stored in the vehicle, so that the battery charging and swap station authenticates, based on backup verification information, the vehicle with the battery to be swapped, wherein the backup verification information is a backup public key matched to the private key and pre-stored at the battery charging and swap station.

12. The off-line battery swap method according to claim 11, wherein the backup connection information comprises at least one of backup account information, backup password information, and backup address information.

\* \* \* \* \*